Patented Aug. 25, 1953

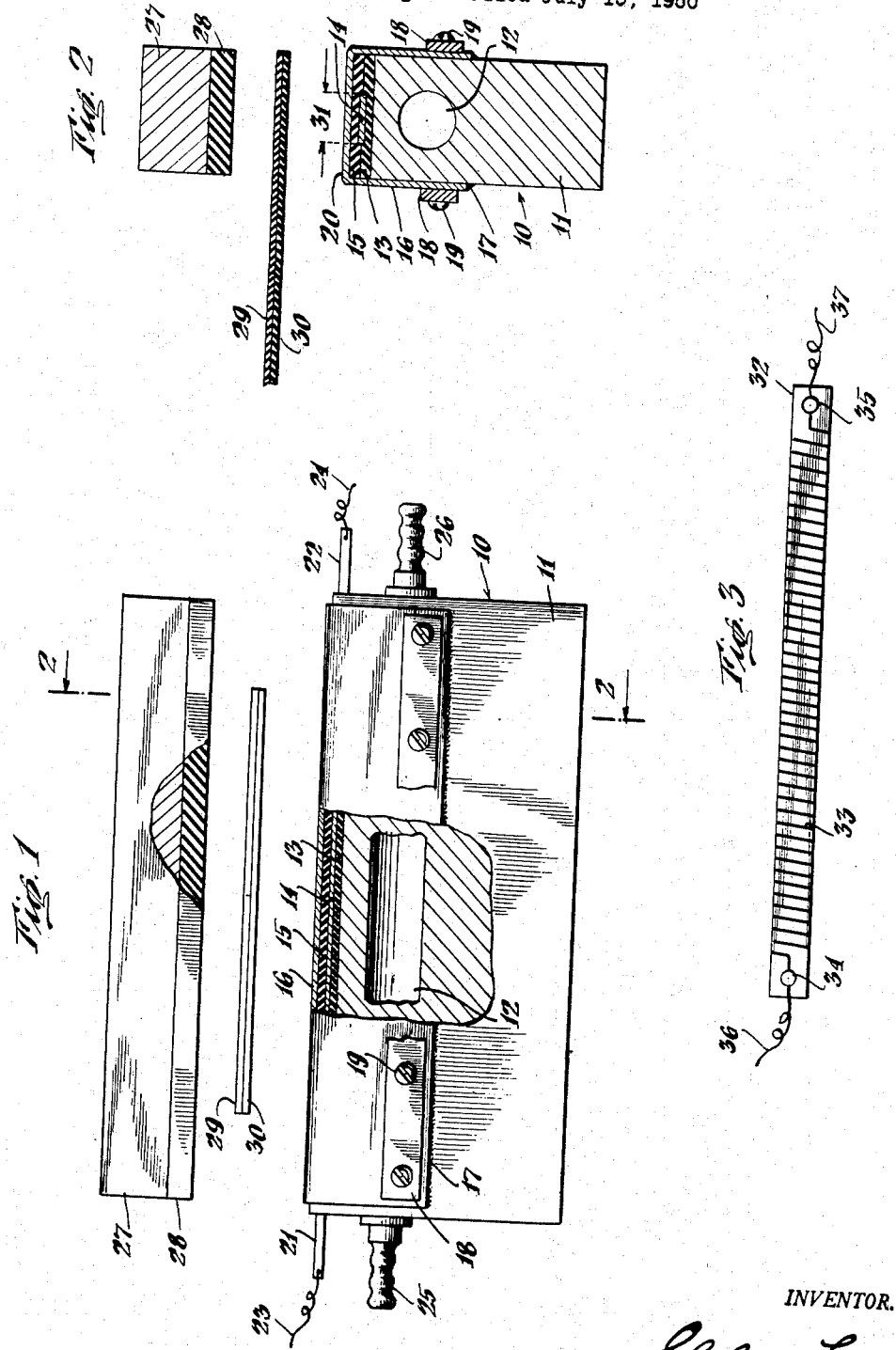

2,650,183

UNITED STATES PATENT OFFICE 2,650,183

HEATSEALING METHOD

Nicholas Langer, New York, N. Y.

Original application July 15, 1950, Serial No. 174,074. Divided and this application August 7, 1951, Serial No. 240,653

4 Claims. (Cl. 154—126)

This invention relates to the art of heatsealing thermoplastic films, and, more particularly, to a novel and improved heatsealing method of the thermal impulse type.

The present application is a division of my co-pending application Serial No. 174,074, filed July 15, 1950, now Patent No. 2,574,095, granted November 6, 1951.

As disclosed in my Patent No. 2,460,460, heatsealing machines of the thermal impulse type essentially comprise a pair of pressure members or bars and a reciprocating mechanism therefor whereby pressure may be applied upon two or more layers of thermoplastic film to be heatsealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinylidene chloride). A heater element in the form of a thin and narrow strip of a metal of high specific resistance, such as a suitable nickel-chromium alloy known in the trade as Nichrome, is mounted on the face of at least one of said bars, constituting the operating or sealing surface of the machine. Sealing pulses of electric current may be passed through the said heater element under the control of a switching mechanism, the operation of which is coordinated to that of the reciprocating mechanism of the bars.

During the operation of the machine, operation of the switching mechanism is initiated substantially when the pressure members arrive into their pressure-applying position. A short pulse of current is then passed through the heater element, which, as a result of its low heat capacity, is heated to heatsealing temperature in a small fraction of a second. The heat thus produced is immediately transferred by surface contact to the region of the thermoplastic layers compressed between the bars, causing heatsealing thereof. A short period thereafter, the heat produced by the pulse of current is dissipated and the seal is cooled and consolidated under pressure whereby a strong and sound seal is obtained.

Heatsealing machines of the thermal impulse type provide important advantages over the commonly used heatsealing machines in which the sealing member is continuously maintained at a constant sealing temperature. Due to the fact that the thermal impulse principle permits the sealed region to cool and to consolidate under pressure, the quality of the seal is greatly improved. Also, the thermal impulse principle makes it possible to readily seal films of materials, which cannot be sealed on an industrial scale with sealing members continuously maintained at constant sealing temperatures, such as particularly Polythene and Saran.

Although the heatsealing machines of the thermal impulse type provided excellent results and achieved remarkable commercial success within a short period after their introduction, certain practical difficulties were experienced particularly when applying the principle to high-speed packaging machinery where it may be desirable to provide as many as two or more complete sealing cycles per second. One of these difficulties was the building up of heat in the sealing strip and its associated supporting structure when the sealing cycles have followed each other in rapid succession. This, under certain conditions, caused the adherence or sticking of the sealed layers to the heater element or strip after the sealing operation since the time between adjoining sealing cycles was too short to permit complete dissipation of the sealing heat and full consolidation of the seal. This difficulty interfered with the desired high operating speeds, which to obtain is the present trend in the entire packaging industry.

I have now discovered that the outstanding problem may be solved in a remarkably simple manner.

It is an object of the present invention to improve heatsealing methods of the thermal impulse type.

It is another object of the present invention to provide an improved heatsealing method of the thermal impulse type in which provision is made for efficient withdrawal of the residual heat present in the seal and the sealing bar and its associated structure after each sealing operation or cycle.

It is also within the contemplation of the invention to provide a novel and improved heatsealing method of the thermal impulse type which is capable of being practiced equally well at low and at extremely high speeds in the complete absence of sticking and which permits the production of perfect seals at practically any commercially required speed.

An additional object contemplated by the present invention is the provision of a novel and improved method of heatsealing thermoplastic films with a heretofore unobtainable efficiency and at a high rate of speed.

Other and further objects and advantages of the invention will become apparent from the following description, taken in conjunction with the accompanying drawing, in which Fig. 1 is a side elevational view, somewhat fragmentary in character and having parts in section, of a preferred embodiment of the invention;

Fig. 2 is a section taken on line 2—2 of Fig. 1; and

Fig. 3 illustrates a modified heater element suitable for the purposes of the invention.

Referring now more particularly to the drawing, reference numeral 10 generally denotes a sealing device embodying the invention which essentially comprises a metal base or bar 11 formed of metal of high heat conductivity, such as copper, brass, or aluminum. It is preferred to use a metal to which a soldered or brazed joint can be readily made. A channel or duct 12 may be provided in the bar, extending along its length for passing a coolant fluid, for example water, therethrough.

Upon the top surface of bar 11, there is provided a first layer 13 of heat-resistant insulating material, such as Teflon (polymerized tetrafluoroethylene), Kel-F (polymerized tetrafluorochloro-ethylene), glass fiber cloth impregnated with silicone resin, and the like. A thin and narrow heater strip 14 of metal or alloy of high specific resistivity is mounted or tensioned on the first insulating layer 13 and constitutes a heater element of low heat capacity for the bar. Examples of suitable high-resistivity materials for the heater strip 14 are Nichrome (a nickel base alloy containing 11-22% chromium and smaller amounts of silicon and manganese), Inconel (a nickel base heat- and oxidation-resistant alloy with approximately 13% chromium, 6% iron, small amounts of manganese, silicon and copper, and Nilvar (a high-nickel iron alloy with about 36% of nickel showing extremely low coefficient of temperature expansion). A second layer 15 of heat-resistant insulating material is placed on top of the heater strip 14. This second layer of insulation 15 may be formed of the same material as that of the first layer of insulation 13. It will be noted that the two layers of insulation 13 and 15 have approximately the same width as that of the top surface of base or bar 11 while the heater strip 14, which is centrally located between the two insulating layers, is of considerably lesser width, such as ⅓ or ¼ of the width of the said layers. Furthermore, the lower insulating layer 13 is of substantial thickness as compared to the thickness of the upper insulating layer 15 which is made as thin as possible and is compatible with the requirements of electrical insulation to be provided between the underlying heater strip or element 14 and the overlying sealing strip 16. As a result, an intimate heat exchange relation will be established between the heater strip 14 and the sealing strip 16 through the minute thickness of the interposed insulating layer 15.

Sealing strip 16 is formed of metal of relatively low heat conductivity, such as of the same metals or alloys of which the heater strip 14 is made, since Nichrome, Inconel or Nilvar, in addition to having low electrical conductivity, also possess the characteristic of relatively low heat conductivity. The sealing strip is made considerably wider than the width of bar 11 and its lateral marginal portions are bent over the top edges of the bar and are pressed against the sides thereof, resulting in an inverted U-shaped cross section. The edges of the sealing strip are secured to the bar in any suitable manner, for example by brazing or soft soldering, as indicated at 17. The same result may be obtained by means of metal clamping strips 18 pressed against the side faces of the bar by screws 19. The top surface 20 of sealing strip 16 constitutes the operating or sealing face of the bar.

Upon assembling the sealing device, sealing strip 16 is tensioned around the top face of bar 11 and fixes the underlying members 13, 14 and 15 in their properly assembled relative position. The two ends 21 and 22 of the heater strip 14 are extended beyond the ends of bar or base 11 so that conductors or leads 23 and 24 may be respectively secured thereto. Of course, more elaborate terminal arrangements may be resorted to, if desired. Nipples 25 and 26 are inserted into the ends of coolant channel 12 whereby the said channel may be readily connected into a flow of coolant fluid by means of rubber tubing.

The sealing device or bar 10 is mounted for cooperation with a conventional pressure bar 27, the lower face of which is preferably provided with a layer or facing 28 of elastic material, for example, silicone rubber. The sealing and pressure bars are arranged for relative reciprocation by means of any suitable conventional manually-operable or motor-driven mechanism.

From the foregoing description, the operation of the sealing device of the invention will be readily understood by those skilled in the art. When it is desired to make a seal, layers 29 and 30 of thermoplastic film are interposed between sealing bar 11 and pressure bar 27 and the bars are displaced toward one another to apply pressure upon the regions of the layers to be heat-sealed. A short pulse of sealing current of suitable intensity is then passed through heater strip 14 by connecting its ends 21, 22 to a source of electric current (not shown) through lead wires 23 and 24. This pulse of current will heat up the said strip to a high temperature practically instantaneously. As the lower insulating layer 13 is considerably heavier than the upper insulating layer 15, most of the heat generated in the heater strip 14 will travel upwardly and by conduction through the minute thickness of insulating layer 15 will rapidly heat up a center portion of sealing strip 16 in a region roughly corresponding to the width of the underlying heater strip 14 and denoted by reference numeral 31 in Fig. 2. Heatsealing of the compressed layers 29, 30 of the thermoplastic film will now occur in the heated region 31 of the sealing face 20.

A short period thereafter, the sealing heat is dissipated and the seal formed is allowed to cool and to consolidate while the pressure upon the seal is still maintained. Finally, the pressure is released and the sealed layers are withdrawn.

Any residual heat remaining in sealing strip 16 is rapidly conducted away into bar 11 formed of metal of high heat conductivity. This is due to the fact that the path from the heated portion 31 of the sealing face 20 to the body of bar 11 is quite short, as this will be readily observed in Fig. 2. Since the heat capacity of bar 11 is very substantial and that of heater strip is very small, the heat withdrawn into the bar will raise its temperature to such moderate extent as will be readily dissipated by radiation or convection. Thus, the structure described is entirely satisfactory for heatsealing machines wherein no extreme speeds of operation are required. However, the rapidity of heat withdrawal from the sealed region of film and from the sealing face of the bar may be further accelerated to any practically necessary extent by passing water, air or some other suitable coolant fluid through channel 12 of bar 11. This is accomplished, for example, by introducing the coolant fluid into channel 12 through inlet nipple 25 and discharging such fluid through outlet nipple 26. As an alternative, a plurality of cooling plates or ribs may be mounted on or may be integrally formed with bar 11 and a blast of air may be directed against the same.

It is to be observed that the heatsealing method of the invention provides various important advantages. The most important of these advantages may be listed as follows:

1. While the sealing strip 16, particularly its operative face 20 is in intimate heat exchange relation with the heater strip 14 through the minute thickness of the interposed insulating layer 15, it is electrically disconnected therefrom by the same layer. Therefore, no current will flow through the sealing strip itself and the current consumption of the entire unit is relatively low.

2. The center region 31 of sealing strip 16 is intensely and intermittently heated by the underlying heater strip 14 during each heating or sealing cycle while its marginal regions are efficiently and continuously cooled by having the lateral edges thereof soldered, brazed, clamped or otherwise secured to corresponding portions of bar 11. Thus, heating or sealing pressure is applied to the thermoplastic layers in the center of their compressed region while cooling pressure is applied to said layers in the remainder of such region. It will be further noted that the said heated and cooled areas in the sealing face are defined in one and the same perfectly smooth and plane surface 20 so that no extrusion or cutting of the sealed layers can occur in the boundary lines defining the said heated and cooled areas. This, of course, is due to the relatively low heat conductivity of the material of the sealing strip which permits maintaining a sharp temperature gradient between different transverse regions thereof.

3. In general, the width of the seal produced roughly corresponds to the width of the heater strip 14 which is preferably about ⅓ or ¼ of the width of the sealing face 18. However, the width of the seal may be adjusted and increased by increasing the intensity or the duration of the sealing pulse of electric current. This will be readily understood if it is considered that the sealing heat produced in heater strip 14 will first heat up the directly overlying portion 31 of sealing face 20. However, in case the sealing pulse of current is sufficiently long or intense, the heat will travel in the plane of the sealing face in both transverse directions a short distance and this will result in widening of sealing region 31.

4. As the sealing face of the unit is completely smooth and as there is no extrusion of the thermoplastic film possible during the sealing operation, sticking of the sealed film to the sealing face is practically completely absent.

5. Removal of the residual heat from the sealing face of the unit and from the sealed regions of the thermoplastic layers is rapid and extremely effective. Therefore, the time required for a complete heating and cooling cycle may be considerably reduced.

6. The sealing bar is extremely rugged both mechanically and electrically since the sealing strip 16 is anchored along the full length of both of its longitudinal edges and is mechanically supported by the underlying generally non-compressible structural elements. On the other hand, the mechanically weak heater strip 14 is fully protected against injury by the sealing strip 16 which completely envelops the same. Thus, the useful life of the sealing device is quite long.

7. The sealing device or bar of the invention is very simple in structure and may be readily manufactured on a practical and industrial scale in any desired length or shape at a low cost.

In order that those skilled in the art may have a better understanding of the invention, the following illustrative example may be given:

In a practical sealing device or bar embodying the invention, bar or base 11 was formed of a brass rod of oblong cross section, having a width of 0.5" and a height of 1". The length of the bar was 12", but this dimension, of course, is determined by the length of the desired seal. Insulating layer 13 was formed of a strip of glass fiber fabric impregnated with silicone resin, having a width of 0.5" and a thickness of 0.01". Heater strip 14 was formed of a Nilvar strip, 0.1" wide and 0.002" thick. Insulating layer 15 was formed of a strip of glass fiber fabric impregnated with silicone resin, having a width of 0.5" and a thickness of 0.003". As the function of this layer is to provide intimate heat exchange relation between the underlying heater strip 14 and the overlying sealing strip 16, while electrically insulating the two elements from each other, its thickness may be considerably less than 0.003". Sealing strip 16 was formed of a Nilvar strip having a width of 1.5' before bending it into U-shape and a thickness of 0.002".

The advantage of using Nilvar for both the heater and the sealing strips resides in the extremely low coefficient of linear heat expansion of this material.

Fig. 3 illustrates a modified heater element which may be substituted for heater element or strip 14. This modified heater element comprises a narrow strip 32 of heat-resistant insulating material, such as mica, glass-fiber fabric impregnated with silicone resin, asbestos, or the like. Windings of wire 33 of high specific resistivity, such as Nichrome, are wound around strip 32 throughout the length thereof, the ends of said wire being soldered or otherwise secured to rivets or eyelets 34 and 35 provided at the two ends of the strip. Lead wires 36 and 37 are attached to members 34 and 35, respectively, and serve for connecting the heater element to a source of electric current.

The advantage of the modified heater element just described resides in the fact that by proper selection of the resistance wire diameter and of the specific resistivity, the element may be readily adapted to the voltage of the source of current used so that, for example, the heater element may be connected directly or through a small rheostat to the direct current or alternating current power line. In contrast to this, the resistance of the heater strip 14 is generally quite low so that it is in many cases necessary to energize such a strip through a step-down transformer from the alternating current power line. The modified heater element shown in Fig. 3 makes it possible to eliminate the transformer which results in considerable saving.

Although the present invention has been disclosed in connection with a few preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

I claim:

1. The method of heatsealing layers of thermoplastic film which comprises pressing one face of a strip of sheet metal against said layers, generating a pulse of sealing heat at the other face of said strip and in a region narrower than said strip to transfer such pulse of heat by conduction through the thickness of the strip to said layers of film and to cause heatsealing thereof in said region, and withdrawing residual heat from said strip by conduction in the plane thereof through a direct metallic path including the lateral marginal portions of the strip into a body of relatively high heat capacity.

2. The method of heatsealing layers of thermoplastic film which comprises compressing the layers between a pair of normally cool surfaces at least one of which is formed by one face of a strip of sheet metal, practically instantaneously generating a pulse of sealing heat at the other face of said strip and in a region narrower than said strip to transfer such pulse of heat by conduction through the thickness of the strip to said layers of film thereby to cause heatsealing thereof in said region, continuously withdrawing residual heat from said strip by conduction in the plane thereof through a direct metallic path including the lateral marginal portions of the strip into a body of relatively high heat capacity thereby to cool the sealed region, and then releasing the pressure.

3. The method of heatsealing layers of thermoplastic film which comprises providing a direct metallic heat conducting path between the lateral marginal portions of a strip of sheet metal and a body of relatively high heat capacity maintained at a constant low temperature, pressing a surface of said strip against said layers, producing a thermal impulse at the other surface of said strip and in a central region narrower than said strip to transfer such impulses by conduction through the thickness of the strip to said layers of film thereby to cause heatsealing thereof in said region, the said conductively cooled marginal portions of the strip being effective in withdrawing residual heat from the sealed region of the layers, and then releasing said pressure after the sealed region has cooled and consolidated.

4. The method of heatsealing layers of thermoplastic film which comprises continuously withdrawing heat at the lateral marginal portions of a strip of sheet metal through a direct metallic path into a body of relatively high heat capacity, pressing one face of said strip against said layers, dissipating a predetermined amount of electrical energy and thereby generating a thermal impulse adjacent to the other face of said strip and in a region central to but narrower than the strip, said thermal impulse being transferred by conduction through the thickness of the strip to said layers of film and causing heatsealing thereof in said region, the heat withdrawn at the marginal portions of the strip being effective in cooling said sealed region by conduction of residual heat in the plane of the strip, and then releasing the pressure after the sealed region has cooled and consolidated.

NICHOLAS LANGER.

References Cited in the file of this patent

UNITED STATES PATENTS

| Number | Name | Date |
| --- | --- | --- |
| 2,460,460 | Langer | Feb. 1, 1949 |
| 2,574,094 | Fener et al. | Nov. 6, 1951 |
| 2,574,095 | Langer | Nov. 6, 1951 |